US012619009B2

(12) United States Patent
Kobayashi

(10) Patent No.: US 12,619,009 B2
(45) Date of Patent: May 5, 2026

(54) OPTICAL LAMINATE AND ARTICLE

(71) Applicant: DEXERIALS CORPORATION, Shimotsuke (JP)

(72) Inventor: Tomoaki Kobayashi, Shimotsuke (JP)

(73) Assignee: Dexerials Corporation, Shimotsuke (JP)

( * ) Notice: Subject to any disclaimer, the term of this patent is extended or adjusted under 35 U.S.C. 154(b) by 357 days.

(21) Appl. No.: 18/036,936

(22) PCT Filed: Nov. 25, 2021

(86) PCT No.: PCT/JP2021/043096
§ 371 (c)(1),
(2) Date: May 15, 2023

(87) PCT Pub. No.: WO2022/114037
PCT Pub. Date: Jun. 2, 2022

(65) Prior Publication Data
US 2024/0019605 A1 Jan. 18, 2024

(30) Foreign Application Priority Data
Nov. 27, 2020 (JP) ................................. 2020-196902

(51) Int. Cl.
*G02B 1/115* (2015.01)
*G02B 1/14* (2015.01)
(52) U.S. Cl.
CPC ................ *G02B 1/115* (2013.01); *G02B 1/14* (2015.01)

(58) Field of Classification Search
CPC ............. G02B 1/115; G02B 1/14; G02B 1/18
See application file for complete search history.

(56) References Cited

U.S. PATENT DOCUMENTS

2009/0104385 A1    4/2009  Reymond
2017/0235020 A1    8/2017  Bolshakov

FOREIGN PATENT DOCUMENTS

CN           101400619  A     4/2009
JP          2009529715  A     8/2009
JP          2016177186  A    10/2016
JP          2017515780  A     6/2017
JP          2019028364  A     2/2019
JP          2020126182  A     8/2020
KR          20200022029 A     3/2020
TW          202039754   A    11/2020
WO     WO-2020162195 A1     8/2020

OTHER PUBLICATIONS

Written Opinion issued Dec. 28, 2021 in PCT/JP2021/043096 (with English translation), 6 pages.

(Continued)

*Primary Examiner* — Phu Vu
(74) *Attorney, Agent, or Firm* — Element IP, PLC

(57) ABSTRACT
This optical laminate contains a transparent substrate, an optical functional layer and an antifouling layer laminated in that order, wherein when a light with a wavelength of 380 nm to 780 nm from a standard light source D65 is incident upon the optical laminate at an incident angle within a range from 5° to 50° relative to the surface, the a* value and the b* value in the CIE-Lab color system of the reflected light are within the same quadrant of the a*b* plane.

12 Claims, 5 Drawing Sheets

(56)     References Cited

OTHER PUBLICATIONS

Office Action issued Apr. 4, 2024 in Korean Patent Application No. 10-2023-7007301 (with English translation), 10 pages.

Office Action issued Jun. 4, 2024 in corresponding Japanese Patent Application No. 2021-207512 (with English translation), 10 pages.

Combined Taiwanese Office Action and Search Report issued May 14, 2025, in corresponding Taiwanese Patent Application No. 110144239 (with machine English translation), 18 pages.

International Search Report issued Dec. 28, 2021 in PCTJP2021043096 (with English translation), 5 pages.

Office Action issued on Jun. 1, 2021 in Japanese Patent Application No. 2020-196902 (with English translation), 8 pages.

Office Action issued on Oct. 5, 2021 in Japanese Patent Application No. 2020-196902 (with English translation), 8 pages.

Office Action issue Nov. 5, 2024, in corresponding Japanese Patent Application No. 2021-207512 (with machine English translation), 8 pages.

Combined Chinese Office Action and Search Report issued Aug. 29, 2025, in corresponding Chinese Patent Application No. 202180074516.9 (with machine English translation), 17 pages.

Office Action issued Jan. 26, 2026, in corresponding Chinese Patent Application No. 202180074516.9 (with machine English translation), 15 pages.

Office Action issued Dec. 22, 2025, in corresponding Indian Patent Application No. 202317035413, 7 pages.

FIG. 3
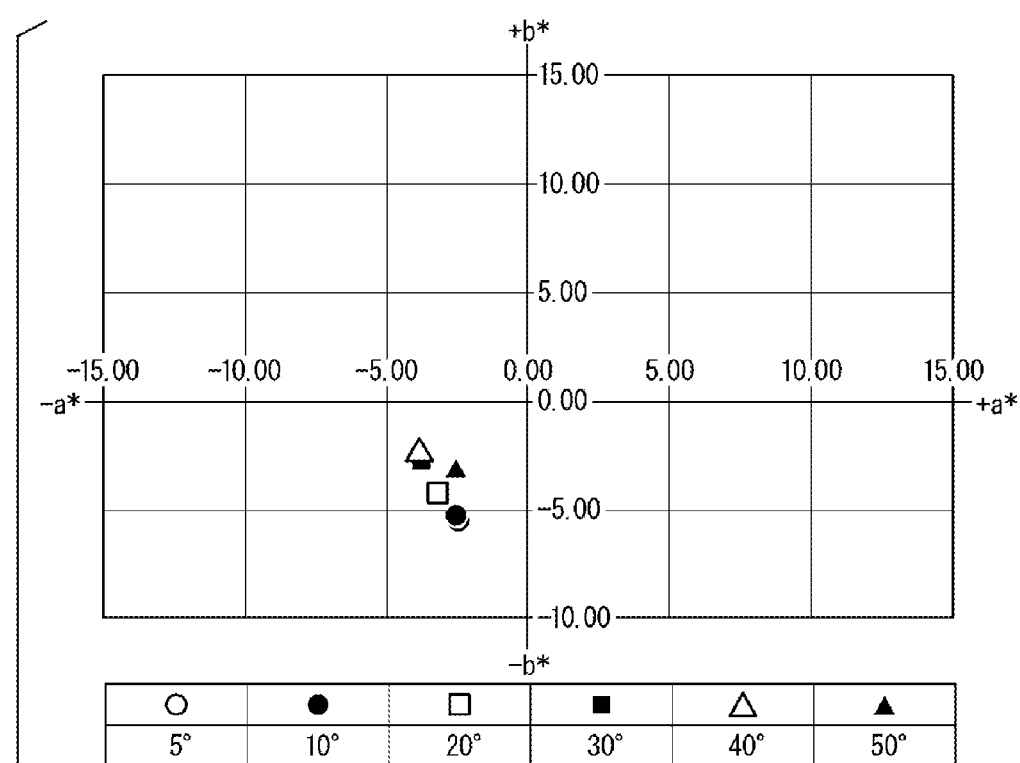
FIG. 4
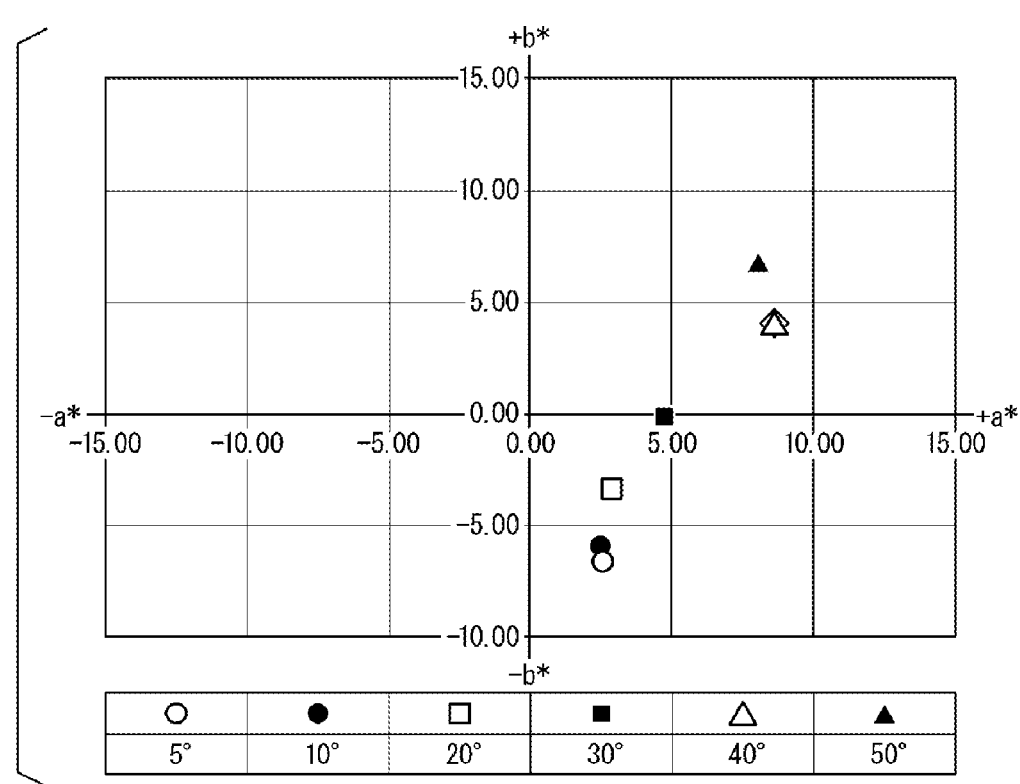

| ○ | ● | □ | ■ | △ | ▲ |
|---|---|---|---|---|---|
| 5° | 10° | 20° | 30° | 40° | 50° |

OPTICAL LAMINATE AND ARTICLE

TECHNICAL FIELD

The present invention relates to an optical laminate and an article.

Priority is claimed on Japanese Patent Application No. 2020-196902, filed Nov. 27, 2020, the content of which is incorporated herein by reference.

BACKGROUND ART

Image display devices such as flat panel displays (FPD) are widely used in mobile telephones, smart phones, and car navigation devices and the like.

In conventional image display devices, it is desirable to suppress any color irregularity caused by viewing angle.

For example, Patent Document 1 discloses an anti-reflective film for which the luminous reflectance when a light A with a wavelength of 380 nm to 780 nm from a standard light source D65 is incident upon the film at an incident angle of 5° is not more than 0.5%, and for which regular reflection light generated when the incident angle of the light A on the film is varied within a range from 5° to 50° exhibits a ratio of the difference between the maximum value and the minimum value of the b* value in the CIE-Lab color system relative to the difference between the maximum value and the minimum value of the a* value in the CIE-Lab color system (difference of b* value/difference of a* value) that is 2 or greater.

CITATION LIST

Patent Document

[Patent Document 1]
Japanese Unexamined Patent Application, First Publication No. 2019-28364

SUMMARY OF INVENTION

Technical Problem

Optical laminates such as anti-reflective films installed on image display devices preferably cause no visible color irregularities, even when the viewing angle is altered for the image display device on which the optical laminate is installed.

However, with conventional optical laminates, color irregularities (differences in color tone) have sometimes been visible when the viewing angle is changed for the image display device on which the optical laminate is installed.

Accordingly, for optical laminates installed on image display devices, it is desirable that color irregularities are difficult to visually detect when the viewing angle for the image display device is altered.

The present invention has been developed in light of the above circumstances, and has an object of providing an optical laminate which is provided on an article, and for which color irregularities are difficult to visually detect even when the viewing angle of the article is altered.

Further, the present invention also has an object of providing an article that includes the optical laminate of the present invention, and exhibits little color irregularity when the viewing angle is altered.

Solution to Problem

In order to achieve the above objects, this invention proposes the following aspects.

[1] An optical laminate containing a transparent substrate, an optical functional layer and an antifouling layer laminated in that order, wherein when a light with a wavelength of 380 nm to 780 nm from a standard light source D65 is incident upon the optical laminate at an incident angle within a range from 5° to 50° relative to the surface, the a* value and the b* value in the CIE-Lab color system of the reflected light are within the same quadrant of the a*b* plane.

[2] The optical laminate according to [1], wherein the a* value and the b* value of the reflected light when the light is incident at an incident angle within a range from 5° to relative to the surface are both less than zero.

[3] The optical laminate according to [1] or [2], wherein the maximum value of the difference between the reflectance values when the light is incident at an incident angle of 10°, 20°, 30°, 40° and 50° relative to the surface, and the reflectance when the light is incident at an incident angle of 5°, expressed as an absolute value, is 1% or less.

[4] The optical laminate according to any one of [1] to [3], wherein the reflected light when the light is incident at an incident angle within a range from 5° to 50° relative to the surface has a ΔE*ab value represented by formula (1) shown below of 10 or less.

[Formula 1]

$$\Delta E^*ab = \sqrt{\Delta L^{*2} + \Delta a^{*2} + \Delta b^{*2}} \qquad \text{Formula (1)}$$

(In formula (1), ΔE*ab represents the amount of change in the L* value and the aforementioned a* value and b* value in the CIE-Lab color system. ΔL* represents the maximum value of the difference between the L* values of the reflected light when the light is incident at an incident angle of 10°, 20°, 30°, 40° and 50°, and the L* value of the reflected light when the light is incident at an incident angle of 5°. Δa* represents the maximum value of the difference between the a* values of the reflected light when the light is incident at an incident angle of 10°, 20°, 30°, 40° and 50°, and the a* value of the reflected light when the light is incident at an incident angle of 5°. Δb* represents the maximum value of the difference between the b* values of the reflected light when the light is incident at an incident angle of 10°, 20°, 30°, 40° and 50°, and the b* value of the reflected light when the light is incident at an incident angle of 5°.)

[5] The optical laminate according to any one of [1] to [4], wherein the optical functional layer is a laminate having a low refractive index material layer and a high refractive index material layer formed from a material with a higher refractive index than the low refractive index material layer laminated in an alternating arrangement, a first high refractive index material layer formed from the high refractive index material layer and having a thickness of at least 7.5 nm is disposed on the transparent substrate side of the laminate, a first low refractive index material layer formed from the low refractive index material layer and having a thickness of 27 nm to 37 nm is disposed in contact with the first high refractive index material layer, and a second low refractive index material layer formed from the low refractive index material layer and having a thickness of 85 nm to 103 nm is disposed on the antifouling layer side of the laminate.

[6] The optical laminate according to [5], wherein a second high refractive index material layer formed from the high refractive index material layer and having a thickness of at least 105 nm to 120 nm is disposed between the first low refractive index material layer and the second low refractive index material layer, and the optical functional layer is composed of four layers: the first high refractive index material layer, the first low refractive index material layer, the second high refractive index material layer, and the second low refractive index material layer.

[7] The optical laminate according to any one of [1] to [6], further containing an adhesive layer between the transparent substrate and the optional functional layer, wherein the adhesive layer is formed from one substance, or two or more substances, selected from the group consisting of metals, alloys, metal oxides, metal fluorides, metal sulfides and metal nitrides.

[8] The optical laminate according to [7], wherein the adhesive layer is a metal oxide in an oxygen-deficient state.

[9] The optical laminate according to [7] or [8], further containing a hard coat layer between the transparent substrate and the adhesive layer.

[10] An article provided with the optical laminate according to any one of [1] to [9].

[11] The article according to [10], wherein the optical laminate is provided on the surface of an image display device.

Advantageous Effects of Invention

In the optical laminate of the present invention, when a light with a wavelength of 380 nm to 780 nm from a standard light source D65 is incident upon the optical laminate at an incident angle within a range from 5° to 50° relative to the surface, the a* value and the b* value in the CIE-Lab color system of the reflected light are within the same quadrant of the a*b* plane. Consequently, when the optical laminate of the present invention is provided on an article, color irregularities are difficult to visually detect, even when the viewing angle of the article is altered.

Further, an article of the present invention is provided with the optical laminate of the present invention, and therefore color irregularities are unlikely to be visually detectable even when the viewing angle of the article is altered.

BRIEF DESCRIPTION OF DRAWINGS

FIG. 3 is a graph illustrating the a* values and the b* values in the CIE-Lab color system of reflected light when light with a wavelength of 380 nm to 780 nm from a standard light source D65 is incident at incident angles of 5°, 10°, 20°, 30°, 40° and 50° relative to the surface of the optical laminate of Example 2.

FIG. 4 is a graph illustrating the a* values and the b* values in the CIE-Lab color system of reflected light when light with a wavelength of 380 nm to 780 nm from a standard light source D65 is incident at incident angles of 5°, 10°, 20°, 30°, 40° and 50° relative to the surface of the optical laminate of Comparative Example 1.

DESCRIPTION OF EMBODIMENTS

In order to achieve the objects described above, and obtain an optical laminate for which color irregularities (differences in color tone) are difficult to visually detect even when the viewing angle of the article on which the optical laminate is provided is altered, the inventors of the present invention conducted intensive research focused on the relationship between the viewing angle of the article and the chromaticity (hue) of the reflected light.

As a result, they discovered that when light with a wavelength of 380 nm to 780 nm from a standard light source D65 is incident at an incident angle within a range from 5° to 50° relative to the article surface, provided the a* value and the b* value in the CIE-Lab color system of the reflected light are within the same quadrant of the a*b* plane, color irregularities are difficult to visually detect even when the viewing angle for the article is altered across a wide range from 5° to 50°.

Here, the expression "within the same quadrant" means inside the same quadrant when the a*b* plane is represented as a rectangular coordinate system with a*=0, b*=0 as the origin.

Moreover, based on the above finding, the inventors conducted various investigations using optical laminates containing a transparent substrate, an optical functional layer and an antifouling layer laminated in that order, wherein the optical functional layer is composed of a laminate having a low refractive index material layer and a high refractive index material layer formed from a material with a higher refractive index than the low refractive index material layer laminated in an alternating arrangement.

As a result, they discovered that it was advantageous to dispose a high refractive index material layer having a thickness of at least 7.5 nm and a low refractive index material having a thickness of 27 nm to 37 nm in that order on the transparent substrate side of the laminate, and to dispose a low refractive index material layer having a thickness of 85 nm to 103 nm on the antifouling layer side of the laminate.

The optical laminate and article of the present invention are described below in detail with appropriate reference to the drawings. The drawings used in the following description may sometimes be drawn with specific portions enlarged as appropriate to facilitate comprehension of the features of the present invention, and the dimensional ratios and the like between the constituent elements may differ from the actual values. Further, the materials and dimensions and the like presented in the following description are merely examples, which in no way limit the present invention, and may be altered as appropriate within the scope of the present invention.

[Optical Laminate]

Figure 1:
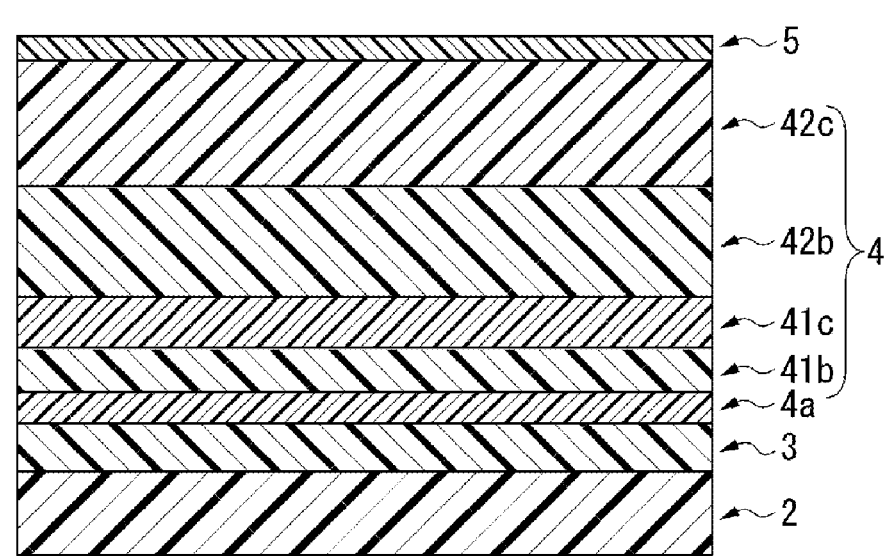
FIG. 1 is a cross-sectional schematic view illustrating one example of an optical laminate of the present invention.

FIG. 1 is a cross-sectional schematic view illustrating one example of the optical laminate of the present invention.

The optical laminate 1 illustrated in FIG. 1 is provided on an article (not shown in the drawing). Examples of the article include an article composed of the optical laminate 1 provided on the surface of an image display device (not shown in the drawing).

The optical laminate 1 illustrated in FIG. 1 has a transparent substrate 2, a hard coat layer 3, an adhesive layer 4*a*, an optical functional layer 4, and an antifouling layer 5 laminated in that order. The optical functional layer 4 provided in the optical laminate 1 of the present embodiment functions as an anti-reflective layer. As illustrated in FIG. 1, the optical functional layer 4 is composed of a laminate having a first high refractive index material layer 41*b*, a first low refractive index material layer 41*c*, a second high refractive index material layer 42*b*, and a second low refractive index material layer 42*c* laminated in that order from the side of the transparent substrate 2.

Figure 2:
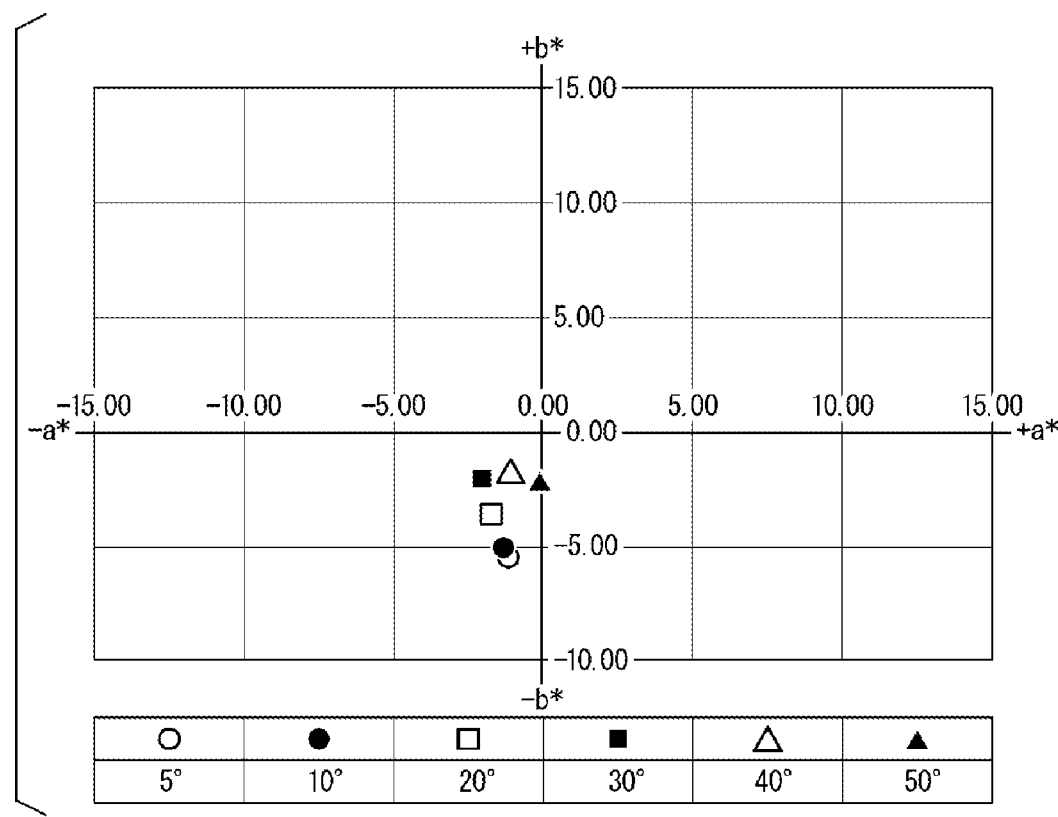
FIG. 2 is a graph illustrating the a* values and the b* values in the CIE-Lab color system of reflected light when light with a wavelength of 380 nm to 780 nm from a standard light source D65 is incident at incident angles of 5°, 10°, 20°, 30°, 40° and 50° relative to the surface of the optical laminate of Example 1.

FIG. 2 is a graph illustrating the a* values and the b* values in the CIE-Lab color system of reflected light when light with a wavelength of 380 nm to 780 nm from a standard light source D65 is incident at incident angles of 5°, 10°, 20°, 30°, 40° and 50° relative to the surface of one example of the optical laminate 1 of the present embodiment.

In FIG. 2, the a* value and b* value indicate the chromaticity, and colors with coordinates having larger absolute values for the a* value and the b* value represent colors of higher saturation. In other words, in FIG. 2, colors with coordinates having larger absolute values for the a* value and the b* value are more vivid colors, whereas colors with coordinates having smaller absolute values for the a* value and the b* value are colors closer to achromatic colors. Typically, +a* coordinates indicate hues in the red direction, −a* coordinates indicate hues in the green direction, +b* coordinates indicate hues in the yellow direction, and −b* coordinates indicate hues in the blue direction.

The L* value, a* value and b* value in the CIE-Lab color system are calculated using an UV-visible-infrared spectrophotometer (V-550 manufactured by JASCO Corporation), using the calculation formulas in the program provided with the UV-visible-infrared spectrophotometer.

With the optical laminate 1 of the present embodiment, when a light with a wavelength of 380 nm to 780 nm from a standard light source D65 is incident upon the optical laminate at an incident angle within a range from 5° to 50° relative to the surface, the a* value and the b* value in the CIE-Lab color system of the reflected light are within the same quadrant of the a*b* plane. Accordingly, the reflected light obtained when light is incident upon the optical laminate 1 of the present embodiment at any incident angle within a range from 5° to 50° is of a similar hue. Consequently, in an article on which the optical laminate 1 of the present embodiment has been installed, color irregularities are difficult to visually detect, even when the viewing angle is altered.

As illustrated in FIG. 2, when light is incident upon the optical laminate 1 of the present embodiment at an incident angle within a range from 5° to 50° relative to the surface of the optical laminate, the a* value and b* value of the reflected light are both preferably less than zero. In such cases, the reflected light when light is incident upon the surface of the optical laminate 1 at any incident angle from 5° to 50° always has a blue-green hue. Compared with hues such as yellow-green and orange hues, blue-green hues have low visibility, and are less likely to affect the hue of the article. As a result, when the a* value and b* value of the reflected light when light is incident at an incident angle of 5° to 50° are both less than zero, an article having the optical laminate 1 provided on the surface is unlikely to exhibit visible changes in hue (color tendency) upon alteration of the viewing angle, and color irregularities are even more difficult to visually detect. Moreover, when the b* value is less than zero, the reflectance is lower than when the b* value exceeds zero. Accordingly, an optical laminate 1 is obtained in which the function of the anti-reflective layer is particularly favorable.

In the optical laminate 1 of the present embodiment, when light is incident at an incident angle of 5° to 50° relative to the surface, the absolute value of the a* value of the reflected light is preferably not more than 10.0, and more preferably 5.0 or less. Provided the absolute value of the a* value is not more than 10.0, reflected light reflected from an article provided with the optical laminate 1 is less likely to undergo coloration, and color irregularities caused by alteration of the viewing angle of the article are even more difficult to visually detect. The lower limit for the absolute value of the a* value of the reflected light may be zero.

In the optical laminate 1 of the present embodiment, when light is incident at an incident angle of 5° to 50° relative to the surface, the absolute value of the b* value of the reflected light is preferably not more than 10.0, and more preferably 6.0 or less. Provided the absolute value of the b* value is not more than 10.0, reflected light reflected from an article provided with the optical laminate 1 is less likely to undergo coloration, and color irregularities caused by alteration of the viewing angle of the article are even more difficult to visually detect. The lower limit for the absolute value of the b* value of the reflected light may be zero.

In the optical laminate 1 of the present embodiment, the reflected light when light is incident at an incident angle of 5° to 50° relative to the surface of the optical laminate preferably has a ΔE*ab value represented by formula (1) shown below of 10 or less, and more preferably 7 or less. The lower limit for ΔE*ab may be zero.

[Formula 2]

$$\Delta E^*ab = \sqrt{\Delta L^{*2} + \Delta a^{*2} + \Delta b^{*2}} \qquad \text{Formula (1)}$$

(In formula (1), ΔE*ab represents the amount of change in the L* value, the a* value and the b* value in the CIE-Lab color system. ΔL* represents the maximum value of the difference between the L* values of the reflected light when the light is incident at an incident angle of 10°, 20°, 30°, 40° and 50°, and the L* value of the reflected light when the light is incident at an incident angle of 5°. Δa* represents the maximum value of the difference between the a* values of the reflected light when the light is incident at an incident angle of 10°, 20°, 30°, 40° and 50°, and the a* value of the reflected light when the light is incident at an incident angle of 5°. Δb* represents the maximum value of the difference between the b* values of the reflected light when the light is incident at an incident angle of 10°, 20°, 30°, 40° and 50°, and the b* value of the reflected light when the light is incident at an incident angle of 5°.)

In those cases where the reflected light when light is incident at an incident angle within a range from 5° to 50° yields a ΔE*ab value represented by formula (1) of 10 or less, changes in the hue (color tendency) and brightness upon alteration of the viewing angle tend to be small. Accordingly, an optical laminate 1 is obtained for which color irregularities caused by alteration of the viewing angle of the article are even more difficult to visually detect. If the ΔE*ab value represented by formula (1) is 7 or less, then changes in the hue and brightness upon alteration of the viewing angle are even smaller, which is particularly desirable.

In the optical laminate 1 of the present embodiment, the L* value, the a* value and the b* value in the CIE-Lab color system of reflected light when light is incident at an incident angle of 5° to 50° relative to the surface can be adjusted by appropriate selection of the thickness of the first high refractive index material layer 41b, the thickness of the first low refractive index material layer 41c and the thickness of the second low refractive index material layer 42c within the optical functional layer 4.

In the optical laminate 1 of the present embodiment, the maximum value of the difference between the reflectance values when light is incident at an incident angle of 20°, 30°, 40° and 50° relative to the surface, and the reflectance when light is incident at an incident angle of 5°, expressed as an absolute value, is preferably 1% or less, and more preferably 0.7% or less. Provided the absolute value of the maximum value of the above difference in the reflectance is 1% or less, an optical laminate is obtained for which color irregularities caused by alteration of the viewing angle of the article are even more difficult to visually detect. The lower limit for the maximum value of the above difference in the reflectance may be zero.

The reflectance is calculated using an UV-visible-infrared spectrophotometer (V-550 manufactured by JASCO Corporation), using calculation formulas in the program provided with the UV-visible-infrared spectrophotometer.

(Transparent Substrate)

A conventional transparent substrate may be used as the transparent substrate 2 used in forming the optical laminate 1 of the present embodiment.

The transparent substrate 2 is formed from a transparent material that allows transmission of light in the visible light region. In embodiments of the present invention, the term "transparent material" means a material for which the transmittance of light in the visible light region is 80% or higher.

For example, a plastic film may be used as the transparent substrate 2. Examples of the material for the plastic film include polyester-based resins, acetate-based resins, polyethersulfone-based resins, polycarbonate-based resins, polyamide-based resins, polyimide-based resins, polyolefin-based resins, (meth)acrylic-based resins, polyvinyl chloride-based resins, polyvinylidene chloride-based resins, polystyrene-based resins, polyvinyl alcohol-based resins, polyarylate-based resins, and polyphenylene sulfide-based resins. Among these resins, the use of one or more resins selected from among polyester-based resins, acetate-based resins, polycarbonate-based resins and polyolefin-based resins as the material for the plastic film is preferred, and the use of polyethylene terephthalate (PET) or triacetyl cellulose (TAC) is particularly preferred.

The transparent substrate 2 may also contain a reinforcing material, provided the optical characteristics of the optical laminate 1 are not impaired Examples of the reinforcing material include cellulose nanofiber, and nanosilica and the like.

The transparent substrate 2 may also be formed from an inorganic material such as a glass film.

A transparent substrate that has been subjected to a surface treatment may be used as the transparent substrate 2. Examples of this surface treatment include etching treatments such as sputtering, corona discharge, ultraviolet irradiation, electron beam irradiation, chemical treatments and oxidation, as well as undercoat treatments. By subjecting the transparent substrate 2 to a surface treatment using one or more methods selected from among these surface treatments, a transparent substrate 2 that exhibits favorable adhesion with the hard coat layer 3 can be obtained.

If necessary, a film imparted with an optical function and/or physical function may also be used as the transparent substrate 2. Examples of films having an optical function and/or physical function include polarizing films, phase difference compensation films, heat ray blocking films, conductive films, brightness enhancing films, and lens sheets. Moreover, a substrate prepared, for example, by imparting a function such as an antistatic function to a film having an optical function and/or physical function may also be used as the transparent substrate 2.

The thickness of the transparent substrate 2 is preferably at least 25 μm, and more preferably 40 μm or greater. Provided the thickness of the transparent substrate 2 is at least 25 μm, the occurrence of wrinkling is unlikely even if strain is applied to the optical laminate 1, which is desirable. Further, provided the thickness of the transparent substrate 2 is at least 25 μm, even when the hard coat layer 3 is formed on the transparent substrate 2 during production of the optical laminate 1, wrinkling of the transparent substrate 2 is unlikely, and production can be conducted with good yield. Furthermore, provided the thickness of the transparent substrate 2 is at least 25 μm, the optical laminate 1 is resistant to curling during the production of the optical laminate 1, and handling is easier, both of which are desirable.

The thickness of the transparent substrate 2 is preferably not more than 1 mm, more preferably not more than 500 μm, and particularly preferably 300 μm or less. Provided the thickness of the transparent substrate 2 is not more than 1 mm, substantive optical transparency can be maintained for the transparent substrate 2. Further, provided the thickness of the transparent substrate 2 is not more than 1 mm, film formation on the transparent substrate 2 can be conducted using either a sheet-to-sheet method or a roll-to-roll method. In particular, if the thickness of the transparent substrate 2 is 300 μm or less, then in those cases where the optical laminate 1 is produced using a roll-to-roll method, the length of substrate that can be incorporated when winding the transparent substrate 2 into a single roll can be lengthened. Accordingly, provided the thickness of the transparent substrate 2 is 300 μm or less, superior productivity can be achieved when producing the optical laminate 1 in a continuous manner using a roll-to-roll method. Further, if the thickness of the transparent substrate 2 is 300 µm or less, then a high-quality optical laminate 1 can be obtained, which is also desirable.

The thickness of each layer of the optical laminate 1 is preferably measured by inspecting the cross-section of the optical laminate using a transmission electron microscope (TEM).

There are no particular limitations on the method used for producing the transparent substrate 2, and production may be conducted using a conventional method.

The surface of the transparent substrate 2 may be cleaned, if necessary, prior to the formation of the hard coat layer 3 on the transparent substrate 2. Examples of methods that may be used for cleaning the surface of the transparent substrate 2 include solvent cleaning and ultrasonic cleaning. Cleaning the surface of the transparent substrate 2 enables dust to be removed from the surface of the transparent substrate 2, thus cleaning the surface, and is consequently preferred.

(Hard Coat Layer)

The optical laminate 1 of the present embodiment includes a hard coat layer 3 disposed between the transparent substrate 2 and the adhesive layer 4a. A conventional material may be used as the hard coat layer 3, and examples include materials containing a binder resin and a filler. In addition to the binder resin and the filler, if necessary, the hard coat layer 3 may also include other conventional materials such as leveling agents.

A transparent material is preferably used as the binder resin included in the hard coat layer 3. Examples of binder resins that may be used include ionizing radiation curable resins, thermoplastic resins, and thermosetting resins. A single binder resin may be used alone, or a mixture of two or more resins may be used.

Examples of ionizing radiation curable resins include ethyl (meth)acrylate, ethylhexyl (meth)acrylate, styrene, methylstyrene, N-vinylpyrrolidone, urethane acrylate, polyethylene glycol diacrylate, pentaerythritol triacrylate (PETA), dipentaerythritol hexaacrylate (DPHA), and pentaerythritol tetraacrylate (PETTA). Resins in which one of the above compounds has been modified with PO (propylene oxide), EO (ethylene oxide), or CL (caprolactone) or the like may also be used as the ionizing radiation curable resin.

In this description, the term "(meth)acrylate" means methacrylate and/or acrylate.

In those cases where an ionizing radiation curable resin is included as a binder resin, the hard coat layer 3 may also contain a conventional ionizing radiation curing initiator. For example, when an ultraviolet curable resin such as a (meth)acrylate is included as the ionizing radiation curable resin, an ultraviolet curing initiator such as hydroxycyclohexyl phenyl ketone is preferably included.

Examples of thermoplastic resins include styrene-based resins, (meth)acrylic-based resins, vinyl acetate-based resins, vinyl ether-based resins, halogen-containing resins, alicyclic olefin-based resins, polycarbonate-based resins, polyester-based resins, polyamide-based resins, cellulose derivatives, and silicone-based resins.

Examples of thermosetting resins include phenol resins, urea resins, diallyl phthalate resins, melamine resins, guanamine resins, unsaturated polyester resins, polyurethane resins, epoxy resins, aminoalkyd resins, melamine-urea co-condensation resins, silicon resins, and polysiloxane resins (including so-called silsesquioxanes such as basket-type and ladder-type silsesquioxanes).

From the viewpoints of the antiglare properties of the optical laminate 1, the adhesion with the adhesive layer 4a, and the anti-blocking properties, the filler included in the hard coat layer 3 may be selected from various options in accordance with the intended application of the optical laminate 1. Specifically, for example, conventional fillers such as silica (an oxide of Si) particles, alumina (aluminum oxide) particles, and organic fine particles may be used.

From the viewpoint of improving the antiglare properties of the optical laminate 1, organic fine particles formed from an acrylic resin or the like are preferably used as the filler. The particle size of these organic fine particles is preferably not more than 10 µm, more preferably not more than 5 µm, and particularly preferably 3 µm or less.

From the viewpoint of improving the adhesion with the adhesive layer 4a, silica particles are preferably used as the filler. The particle size of the silica particles is preferably not more than 800 nm, and particularly preferably 100 nm or less.

The thickness of the hard coat layer 3 is, for example, preferably at least 0.5 and more preferably 1 µm or greater. The thickness of the hard coat layer 3 is preferably not more than 100 µm.

The hard coat layer 3 may be composed of a single layer, or may be composed of a plurality of laminated layers.

There are no particular limitations on the method used for producing the hard coat layer 3, and conventional production methods may be used. For example, the hard coat layer 3 may be produced by a coating method. Examples of the coating method include a method in which a coating liquid prepared by dissolving and/or dispersing the materials that constitute the hard coat layer 3 in a solvent is applied to the transparent substrate 2 using a conventional method and then cured. Conventional solvents may be used as the solvent, and may be selected appropriately in accordance with the materials that constitute the hard coat layer 3.

(Adhesive Layer)

In the optical laminate 1 of the present embodiment, the adhesive layer 4a is disposed between the hard coat layer 3 and the optical functional layer 4 provided on the transparent substrate 2. The adhesive layer 4a has the function of binding the optical functional layer 4 and the hard coat layer 3 tightly together.

The adhesive layer 4a is preferably composed of one or more substances selected from among metals such as silicon, nickel, chromium, tin, gold, silver, platinum, zinc, titanium, tungsten, aluminum, zirconium and palladium; alloys of these metals; and oxides, fluorides, sulfides or nitrides of these metals.

In those cases where, for example, the adhesive layer 4a is formed using a sputtering method, a metal with a melting point of 700° C. or lower is preferably used as the material for the adhesive layer 4a. If an attempt is made to form the adhesive layer 4a from a metal having a melting point exceeding 700° C., then the metal that reaches the surface of the hard coat layer 3 upon sputtering tends not to spread adequately, and is liable to become localized.

The adhesive layer 4a may include an inorganic oxide with a nonstoichiometric composition. In such cases, a metal oxide in an oxygen-deficient state is preferred, and a substance containing $SiO_x$ (a silicon oxide) as the main component is particularly preferred. The adhesive layer 4a may be composed solely of a Si oxide, or may also include not more than 50% by mass, and preferably not more than 10% by mass, of another element in addition to the Si oxide. Examples of this other element include Na, which may be included to improve the durability of the adhesive layer 4a, or one or more elements selected from among Zr, Al and N, may be included to improve the hardness of the adhesive layer 4a.

The thickness of the adhesive layer 4a is, for example, preferably within a range from 1 nm to 10 nm, and more preferably from 1 nm to 5 nm. Provided the thickness of the adhesive layer 4a falls within this range, the function of the layer in binding the optical functional layer 4 and the hard coat layer 3 together can be more effectively achieved. Provided the thickness of the adhesive layer 4a is at least 1 nm, the adhesion between the adhesive layer 4a and the hard coat layer 3 is more favorable. Further, provided the thickness of the adhesive layer is not more than 10 nm, an optical laminate 1 is obtained which, when provided on an article, is even less likely to display detectable color irregularities upon alteration of the viewing angle of the article.

There are no particular limitations on the method used for producing the adhesive layer 4a, and conventional production methods may be used. For example, the adhesive layer 4a may be produced by a sputtering method.

(Optical Functional Layer)

The optical functional layer 4 is composed of a laminate having low refractive index material layers (in the case of the example illustrated in FIG. 1, the first low refractive index material layer 41c and the second low refractive index material layer 42c) and high refractive index material layers formed from a material with a higher refractive index than the low refractive index material layers (in the case of the example illustrated in FIG. 1, the first high refractive index material layer 41b and the second high refractive index material layer 42b) laminated in an alternating arrangement.

The optical functional layer 4 diffuses light incident on the optical laminate 1 from the side of the antifouling layer 5. As a result, the optical laminate 1 functions as an anti-reflective layer such that light incident on the optical laminate 1 from the side of the antifouling layer 5 is prevented from being emitted in one direction as reflected light.

As illustrated in FIG. 1, the present embodiment is described using an example in which the optical functional layer 4 is composed of a laminate having four layers: the first high refractive index material layer 41b, the first low refractive index material layer 41c, the second high refractive index material layer 42b and the second low refractive index material layer 42c laminated in that order from the side of the transparent substrate 2.

The total number of low refractive index material layers and high refractive index material layers laminated together to form the optical functional layer 4 is not restricted to four layers, and either three or fewer layers, or five or more layers, may also be selected as appropriate in accordance with the optical characteristics required of the optical functional layer 4.

Specifically, the total number of low refractive index material layers and high refractive index material layers laminated together to form the optical functional layer 4 is preferably within a range from 4 layers to 10 layers, more preferably from 4 layers to 6 layers, and is most preferably 4 layers. In those cases where the optical functional layer 4 is composed of a laminate of the four layers described above, because the number of laminated layers is small and the total thickness is thin, the productivity is superior to cases where the number of laminated layers is five or greater. Further, when the optical functional layer 4 is composed of a laminate of the four layers described above, a lower reflectance optical laminate 1 is achieved and the hue of the reflected light is closer to neutral (achromatic) compared with cases where the number of laminated layers is three or fewer. Furthermore, in those cases where the optical functional layer 4 is composed of a laminate of the four layers described above, an optical laminate 1 is obtained which, when provided on an article, is even less likely to display detectable color irregularities upon alteration of the viewing angle of the article.

In those cases where the optical functional layer 4 includes two or more low refractive index material layers (in the example illustrated in FIG. 1, the first low refractive index material layer 41c and the second low refractive index material layer 42c), the plurality of low refractive index material layers may all have the same refractive index, or some or all of the layers may have different refractive indices.

In those cases where the optical functional layer 4 includes two or more high refractive index material layers (in the example illustrated in FIG. 1, the first high refractive index material layer 41b and the second high refractive index material layer 42b), the plurality of high refractive index material layers may all have the same refractive index, or some or all of the layers may have different refractive indices.

The refractive indices of the low refractive index material layers and the high refractive index material layers can be ascertained using a spectroscopic ellipsometer.

The refractive indices of the first low refractive index material layer 41c and the second low refractive index material layer 42c are preferably within a range from 1.20 to 1.60, and more preferably from 1.30 to 1.50.

The first low refractive index material layer 41c and the second low refractive index material layer 42c preferably contain $SiO_2$ (refractive index: 1.46) as the main component. The first low refractive index material layer 41c and/or the second low refractive index material layer 42c may be composed solely of $SiO_2$, or may also include not more than 50% by mass, and preferably not more than 10% by mass, of another element in addition to the $SiO_2$. Examples of this other element include Na, which may be included to improve the durability of the first low refractive index material layer 41c and/or the second low refractive index material layer 42c, or one or more elements selected from among Zr, Al and N, may be included to improve the hardness of the first low refractive index material layer 41c and/or second low refractive index material layer 42c.

The refractive indices of the first high refractive index material layer 41b and the second high refractive index material layer 42b are preferably within a range from 2.00 to 2.60, and more preferably from 2.10 to 2.45.

Examples of the material for the first high refractive index material layer 41b and the second high refractive index material layer 42b include niobium pentoxide ($Nb_2O_5$, refractive index: 2.33), titanium oxide ($TiO_2$, refractive index: 2.33 to 2.55), tungsten oxide ($WO_3$, refractive index: 2.2), cerium oxide ($CeO_2$, refractive index: 2.2), tantalum pentoxide ($Ta_2O_5$, refractive index: 2.16), zinc oxide (ZnO, refractive index: 2.1), and indium tin oxide (ITO, refractive index: 2.06). Layers formed from niobium pentoxide are preferred as the first high refractive index material layer 41b and the second high refractive index material layer 42b.

The thicknesses of the first low refractive index material layer 41c, the second low refractive index material layer 42c, the first high refractive index material layer 41b and the second high refractive index material layer 42b that constitute the optical functional layer 4 may be set appropriately in accordance with the optical characteristics required of the optical functional layer 4.

In the optical laminate 1 of the present embodiment, in order to ensure that when a light with a wavelength of 380 nm to 780 nm from a standard light source D65 is incident upon the optical laminate at an incident angle within a range from 5° to 50° relative to the surface, the a* value and the b* value in the CIE-Lab color system of the reflected light are within the same quadrant of the a*b* plane, the thicknesses of the first low refractive index material layer 41c, the second low refractive index material layer 42c and the first high refractive index material layer 41b are preferably set to the dimensions described below.

The thickness of the first high refractive index material layer 41b, which is disposed on the side of the transparent substrate 2 of the optical functional layer 4 (laminate), is preferably at least 7.5 nm, and more preferably within a range from 7.5 nm to 10 nm.

The thickness of the first low refractive index material layer 41c, which is disposed in contact with the first high refractive index material layer 41b, is preferably within a range from 27 nm to 37 nm, and more preferably from 28 nm to 33 nm.

The thickness of the second low refractive index material layer 42c, which is disposed on the side of the antifouling layer 5 of the optical functional layer 4, is preferably within a range from 85 nm to 103 nm, and more preferably from 90 nm to 100 nm.

In the optical laminate 1 of the present embodiment, the thickness of the second high refractive index material layer 42b, which is disposed between the first low refractive index material layer 41c and the second low refractive index material layer 42c, is preferably within a range from 105 nm to 120 nm, and more preferably from 110 nm to 115 nm. By ensuring that the thickness of the second high refractive index material layer 42b falls within this range, an optical laminate 1 is obtained which, when provided on an article, is even less likely to display detectable color irregularities upon alteration of the viewing angle of the article.

The total thickness of the optical functional layer 4 in the optical laminate 1 of the present embodiment is preferably within a range from 230 nm to 270 nm, and more preferably from 240 nm to 260 nm. Provided the total thickness of the optical functional layer 4 falls within this range, an optical laminate 1 of even lower reflectance is achieved, and the hue of the reflected light is even closer to neutral (achromatic). Further, provided the total thickness of the optical functional layer 4 falls within the above range, an optical laminate 1 can be obtained which, when provided on an article, is even less likely to display detectable color irregularities upon alteration of the viewing angle of the article. Provided the total thickness of the optical functional layer 4 is at least 230 nm, an optical laminate 1 can be obtained which, when provided on an article, is even less likely to display detectable color irregularities upon alteration of the viewing angle of the article. Furthermore, provided the total thickness of the optical functional layer 4 is not more than 270 nm, the productivity is more favorable.

There are no particular limitations on the method used for producing the optical functional layer 4, and production may be conducted using conventional methods. For example, the optical functional layer 4 can be produced by using sputtering to form the first high refractive index material layer 41b, the first low refractive index material layer 41c, the second high refractive index material layer 42b, and the second low refractive index material layer 42c in that order on the adhesive layer 4a. When both the adhesive layer 4a and the optical functional layer 4 are formed using sputtering methods, the layers can be formed consecutively, and this is desirable. Further, in those cases where the optical functional layer 4 is formed using a sputtering method, the layer tends to be more dense than layers formed using a typical vacuum deposition method or coating method. As a result, a highly durable optical laminate 1 with a water vapor permeability of not more than 1.0 g/m²/day is obtained.

(Antifouling Layer)

The antifouling layer 5 is provided on the surface of the optical functional layer 4 on the opposite side from the hard coat layer 3. The antifouling layer 5 prevents fouling of the optical laminate 1, and suppresses wear of the optical functional layer 4.

The antifouling layer 5 is preferably a layer that contains a fluorine-based compound. For example, compounds containing a fluorine-modified organic group and a reactive silyl group such as an alkoxysilane can be used favorably as the fluorine-based compound. An example of this type of compound is perfluorodecyltriethoxysilane (FDTS).

Examples of commercially available products that are ideal as the material for the antifouling layer 5 include OPTOOL DSX (manufactured by Daikin Industries, Ltd.), KY-1203 (manufactured by Shin-Etsu Chemical Co., Ltd.) and KY-1901 (manufactured by Shin-Etsu Chemical Co., Ltd.).

If necessary, the antifouling layer 5 may also contain additives such as photostabilizers, ultraviolet absorbers, colorants, antistatic agents, lubricants, leveling agents, antifoaming agents, antioxidants, flame retardants, infrared absorbers and surfactants.

The thickness of the antifouling layer 5 may be, for example, within a range from 1 to 20 nm, and is preferably from 3 to 10 nm.

There are no particular limitations on the method used for producing the antifouling layer 5, and production may be conducted using a conventional method, which may be selected appropriately with due consideration of the required durability and the cost. Specifically, the antifouling layer 5 can be produced using a coating method or a deposition method. Examples of the coating method include a method in which a coating liquid prepared by dissolving the materials that constitute the antifouling layer 5 in a solvent is applied to the optical functional layer 4 using a conventional method and then dried. Further, when the antifouling layer 5 is formed by a deposition method, the layer is more dense and exhibits better adhesion to the optical functional layer 4 compared with, for example, an antifouling layer formed by a coating method. Accordingly, an antifouling layer 5 formed by a deposition method has superior wear resistance.

In the optical laminate 1 of the present embodiment, if necessary, one or more layers may be provided on the surface of the transparent substrate 2 on the opposite side from the hard coat layer 3. For example, a pressure sensitive adhesive layer for bonding the optical laminate 1 to another members such as the surface of an image display device may be provided on the surface of the transparent substrate 2 on the opposite side from the hard coat layer 3, or a pressure sensitive adhesive layer and another optical film may be laminated in that order. Examples of this other optical film include a polarizing film, a phase difference compensation film, a half wave plate, or a quarter wave plate. Further, these other optical films may also be formed in contact with the surface of the transparent substrate 2 on the opposite side from the hard coat layer 3.

The optical laminate 1 of the present embodiment includes the transparent substrate 2, the optical functional layer 4 and the antifouling layer 5 laminated in that order, and when a light with a wavelength of 380 nm to 780 nm from a standard light source D65 is incident upon the optical laminate at an incident angle within a range from to 50° relative to the surface, the a* value and the b* value in the CIE-Lab color system of the reflected light are within the same quadrant of the a*b* plane. As a result, when the optical laminate 1 of the present embodiment is provided on an article, color irregularities are difficult to visually detect even when the viewing angle of the article is altered.

[Article]

An article of an embodiment of the present invention includes the optical laminate 1 of an embodiment of the present invention. The article of the present embodiment may have the optical laminate 1 provided on the surface of an image display device. Examples of the image display device include flat panel displays (FPD) such as liquid crystal display panels and organic electroluminescent (EL) display panels.

Examples of the surface of the image display device to which the optical laminate 1 of an embodiment of the present invention is affixed include information input terminal screens such as mobile telephone screens, smart phone screens, tablet terminal screens, personal computer displays, navigation system screens and gaming device control screens, operating screens for operational support devices in aircraft and trains and the like, and electric when the viewing angle for the article is altered. In particular, when the article of the present embodiment has the optical laminate 1 provided on the surface of an image display device, color irregularities within the displayed image are difficult to visually detect even when the viewing angle is altered, which is very desirable.

EXAMPLES

Examples 1 and 2, Comparative Examples 1 and 2

Using the method described below, the optical laminate 1 illustrated in FIG. 1 was produced.

First, a film with a thickness of 80 μm formed from polyethylene terephthalate (PET) was prepared as the transparent substrate 2. Subsequently, a hard coat layer 3 with a thickness of 5 μm was formed on the transparent substrate 2. The hard coat layer 3 was formed using a method in which a coating liquid having the composition shown in Table 1 was applied to the transparent substrate 2 using a bar coater, and the coating liquid was then irradiated with ultraviolet light to initiate a photopolymerization reaction and cure the layer.

TABLE 1

|  | Product name | Manufacturer | Structure | Blend ratio |
|---|---|---|---|---|
| Ionizing radiation curable resin | CN968 | Sartomer | Hexafunctional aliphatic urethane acrylate having polyester skeleton | 8% |
|  | SR444 | Sartomer | Pentaerythritol triacrylate | 7% |
|  | SR610 | Sartomer | Polyethylene glycol (600) diacrylate (polyethylene glycol chain molecular weight: approximately 600) | 11% |
| Silica particles | IPA-ST-L | Nissan Chemical | Silica gel (particle size: 40 to 50 nm, solvent: IPA, solid fraction: 30%) | 37% |
| Ultraviolet curing initiator | Irgacure 184 | BASF | Hydroxycyclohexyl phenyl ketone | 2% |
| Solvent | PGMA |  | Propylene glycol monomethyl ether acetate | 30% |
|  | Butyl acetate |  |  | 5% |
| Total |  |  |  | 100% |
| Leveling agent | BYK377 | BYK | Polyether modified polydimethylsiloxane containing Hydroxyl group | 0.01 parts by weight per 100 parts by weight of the above total | display boards. Among these, the image display device to which the optical laminate 1 is affixed is preferably an image display device that is viewed from all manner of viewing angles during use, and a navigation system screen, a mobile telephone screen, or a smart phone screen is particularly preferred.

The article of the present embodiment is not limited to an article where the optical laminate 1 is provided on the surface of an image display device. For example, the optical laminate 1 of an embodiment of the present invention may be provided on the surfaces of window glass, goggles, the light-receiving surface of solar cells, glass tables, instrument panels, optical sensors, helmet visors, mirrors, head-mounted displays, and lenses such as lenticular lenses.

The surface of the article of the present embodiment on which the optical laminate 1 is provided may be flat or a curved surface.

Because the article of the present embodiment is provided with the optical laminate 1 of an embodiment of the present invention, color irregularities are difficult to visually detect Subsequently, using a Si target and a Nb target as sputtering targets, reactive sputtering using a mixed gas of Ar gas and $O_2$ gas was used to consecutively form an adhesive layer 4a and an optical functional layer 4 on the hard coat layer 3.

In other words, an adhesive layer 4a having a thickness shown in Table 2 and formed from a Si oxide ($SiO_x$) that may have oxygen deficiency, a first high refractive index material layer 41b formed from $Nb_2O_5$ and having a thickness shown in Table 2, a first low refractive index material layer 41c formed from $SiO_2$ and having a thickness shown in Table 2, a second high refractive index material layer 42b formed from $Nb_2O_5$ and having a thickness shown in Table 2, and a second low refractive index material layer 42c formed from $SiO_2$ and having a thickness shown in Table 2 were deposited in that order on the hard coat layer 3.

In Example 1, a layer with a refractive index of 2.3756 was used as the first high refractive index material layer 41b, a layer with a refractive index of 1.4739 was used as the first low refractive index material layer 41c, a layer with a refractive index of 2.3756 was used as the second high refractive index material layer 42*b*, and a layer with a refractive index of 1.4739 was used as the second low refractive index material layer 42*c*.

In Example 2, a layer with a refractive index of 2.3756 was used as the first high refractive index material layer 41*b*, a layer with a refractive index of 1.4739 was used as the first low refractive index material layer 41*c*, a layer with a refractive index of 2.3756 was used as the second high refractive index material layer 42*b*, and a layer with a refractive index of 1.4739 was used as the second low refractive index material layer 42*c*.

In Comparative Example 1, a layer with a refractive index of 2.3756 was used as the first high refractive index material layer 41*b*, a layer with a refractive index of 1.4739 was used as the first low refractive index material layer 41*c*, a layer with a refractive index of 2.3756 was used as the second high refractive index material layer 42*b*, and a layer with a refractive index of 1.4739 was used as the second low refractive index material layer 42*c*.

In Comparative Example 2, a layer with a refractive index of 2.3756 was used as the first high refractive index material layer 41*b*, a layer with a refractive index of 1.4739 was used as the first low refractive index material layer 41*c*, a layer with a refractive index of 2.3756 was used as the second high refractive index material layer 42*b*, and a layer with a refractive index of 1.4739 was used as the second low refractive index material layer 42*c*.

The refractive indices were measured at a wavelength of 550 nm using a spectroscopic ellipsometer.

Daikin Industries, Ltd.) in a fluorine-based solvent (product name: Fluorinert FC-3283, manufactured by 3M Japan Ltd.).

Using the steps outlined above, optical laminates 1 of Examples 1 and 2, and Comparative Examples 1 and 2 were obtained.

In Table 2, the "total thickness" means the combined total of the thickness of the adhesive layer 4*a*, the thickness of the optical functional layer 4, and the thickness of the antifouling layer 5.

Thickness values were measured by inspecting the cross-section of the optical laminates using a transmission electron microscope (TEM).

[Measurement of Chromaticity and Reflectance of Reflected Light]

Using each of the optical laminates of Examples 1 and 2 and Comparative Examples 1 and 2 obtained in the manner described above, an acrylic-based transparent adhesive was used to bond a black acrylic panel to the surface of the optical laminate on the side of the transparent substrate 2, thus preparing a test piece for which rear surface reflection was removed.

Subsequently, using a UV-visible-infrared spectrophotometer (V-550 manufactured by JASCO Corporation), light from a standard light source D65 with a wavelength of 380 nm to 780 nm was irradiated onto the surface of each test piece at an incident angle of 5° from the surface of the test piece on the opposite side from the transparent substrate 2, and the calculation formulas in the program provided with

TABLE 2

| | | | Example 1 | Example 2 | Comparative Example 1 | Comparative Example 2 |
|---|---|---|---|---|---|---|
| Material of transparent substrate | | | PET | PET | PET | PET |
| Adhesive layer thickness (nm) | | | 3 | 3 | 3 | 3 |
| Optical functional layer | First high refractive index material layer | material thickness (nm) | $Nb_2O_5$ 7.5 | $Nb_2O_5$ 8.2 | $Nb_2O_5$ 16 | $Nb_2O_5$ 10 |
| | First low refractive index material layer | material thickness (nm) | $SiO_2$ 28 | $SiO_2$ 31 | $SiO_2$ 38 | $SiO_2$ 26 |
| | Second high refractive index material layer | material thickness (nm) | $Nb_2O_5$ 110 | $Nb_2O_5$ 112 | $Nb_2O_5$ 29 | $Nb_2O_5$ 110 |
| | Second low refractive index material layer | material thickness (nm) | $SiO_2$ 96 | $SiO_2$ 99 | $SiO_2$ 104 | $SiO_2$ 84 |
| Antifouling layer thickness (nm) | | | 5 | 5 | 5 | 5 |
| Number of layers in optical functional layer | | | 4 | 4 | 4 | 4 |
| Total thickness (nm) | | | 249.5 | 258.2 | 195 | 238 |

Next, an antifouling layer 5 with a thickness of 5 nm was formed on the optical functional layer 4 using a method in which a coating liquid was applied to the optical functional layer 4 using a coil bar (product name: No. 579, No. 9 rod, manufactured by Yasuda Seiki Seisakusho, Ltd.), and the coating liquid was then dried at 80° C. for two minutes. The coating liquid used was a solution containing 0.1% by mass of an alkoxysilane compound having a perfluoro polyether group (product name: OPTOOL DSX, manufactured by the UV-visible-infrared spectrophotometer were used to calculate the chromaticity and reflectance of the reflected light from the reflection spectrum. The L* value, the a* value, and the b* value in the CIE-Lab color system were calculated as the chromaticity.

Moreover, for each test piece, a similar method to that described above for when light was incident on the surface of the optical laminate at an incident angle of 5° was used to irradiate light onto the optical laminate at incident angles of 10°, 20°, 30°, 40° and 50°, and the chromaticity and reflectance of the reflected light was calculated in each case. The results are shown in Table 3 to Table 6, and in FIG. 2 to FIG. 9.

TABLE 3

| | | | | Example 1 | | | |
|---|---|---|---|---|---|---|---|
| | Incident angle | 5° | 10° | 20° | 30° | 40° | 50° |
| Optical charac-teristics | Reflectance Y | 0.49 | 0.47 | 0.38 | 0.32 | 0.43 | 1.18 |
| | L* value | 4.46 | 4.21 | 3.43 | 2.90 | 3.90 | 10.40 |
| | a* value | −1.18 | −1.30 | −1.71 | −2.02 | −1.10 | −0.12 |
| | b* value | −5.45 | −5.04 | −3.61 | −2.00 | −1.66 | −2.12 |
| | ΔY | — | −0.03 | −0.11 | −0.17 | −0.06 | 0.69 |
| | ΔE*ab | — | 0.50 | 2.17 | 3.88 | 3.83 | 6.89 |

TABLE 4

| | | | | Example 2 | | | |
|---|---|---|---|---|---|---|---|
| | Incident angle | 5° | 10° | 20° | 30° | 40° | 50° |
| Optical charac-teristics | Reflectance Y | 0.85 | 0.81 | 0.68 | 0.54 | 0.57 | 1.17 |
| | L* value | 7.72 | 7.35 | 6.10 | 4.84 | 5.14 | 10.37 |
| | a* value | −2.44 | −2.63 | −3.21 | −3.72 | −3.80 | −2.50 |
| | b* value | −5.47 | −5.25 | −4.24 | −2.76 | −2.18 | −3.02 |
| | ΔY | — | −0.04 | −0.18 | −0.32 | −0.29 | 0.32 |
| | ΔE*ab | — | 0.47 | 2.17 | 4.16 | 4.39 | 3.61 |

TABLE 5

| | | | | Comparative Example 1 | | | |
|---|---|---|---|---|---|---|---|
| | Incident angle | 5° | 10° | 20° | 30° | 40° | 50° |
| Optical charac-teristics | Reflectance Y | 0.25 | 0.25 | 0.25 | 0.35 | 0.74 | 1.93 |
| | L* value | 2.30 | 2.26 | 2.28 | 3.13 | 6.68 | 15.11 |
| | a* value | 2.54 | 2.50 | 2.86 | 4.73 | 8.63 | 8.03 |
| | b* value | −6.62 | −5.86 | −3.31 | −0.06 | 4.03 | 6.78 |
| | ΔY | — | 0.00 | 0.00 | 0.09 | 0.49 | 1.67 |
| | ΔE*ab | — | 0.76 | 3.33 | 6.97 | 13.03 | 19.34 |

TABLE 6

| | | | | Comparative Example 2 | | | |
|---|---|---|---|---|---|---|---|
| | Incident angle | 5° | 10° | 20° | 30° | 40° | 50° |
| Optical charac-teristics | Reflectance Y | 0.09 | 0.10 | 0.13 | 0.26 | 0.64 | 1.69 |
| | L* value | 0.84 | 0.87 | 1.15 | 2.32 | 5.81 | 13.79 |
| | a* value | 1.04 | 0.98 | 0.75 | 0.46 | 0.56 | 1.28 |
| | b* value | −2.30 | −1.88 | −0.35 | 1.61 | 3.05 | 2.01 |
| | ΔY | — | 0.00 | 0.03 | 0.16 | 0.55 | 1.60 |
| | ΔE*ab | — | 0.43 | 2.00 | 4.22 | 7.33 | 13.65 |

Figure 5:
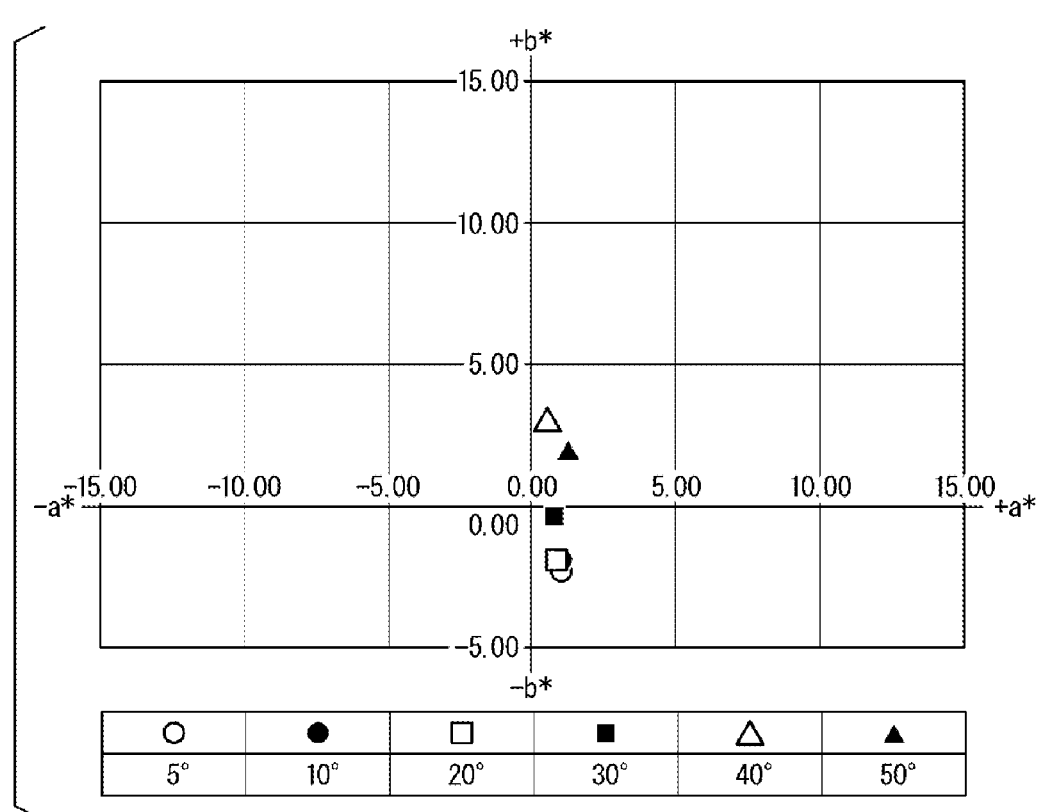
FIG. 5 is a graph illustrating the a* values and the b* values in the CIE-Lab color system of reflected light when light with a wavelength of 380 nm to 780 nm from a standard light source D65 is incident at incident angles of 5°, 10°, 20°, 30°, 40° and 50° relative to the surface of the optical laminate of Comparative Example 2.

FIG. 2 to FIG. 5 are graphs illustrating the a* values and the b* values in the CIE-Lab color system of reflected light when light with a wavelength of 380 nm to 780 nm from a standard light source D65 is incident at incident angles of 5°, 10°, 20°, 30°, and 50° relative to the surface of the optical laminate. FIG. 2 is a graph illustrating the a* values and b* values for Example 1, FIG. 3 is a graph illustrating the a* values and b* values for Example 2, FIG. 4 is a graph illustrating the a* values and b* values for Comparative Example 1, and FIG. 5 is a graph illustrating the a* values and b* values for Comparative Example 2.

Figure 6:
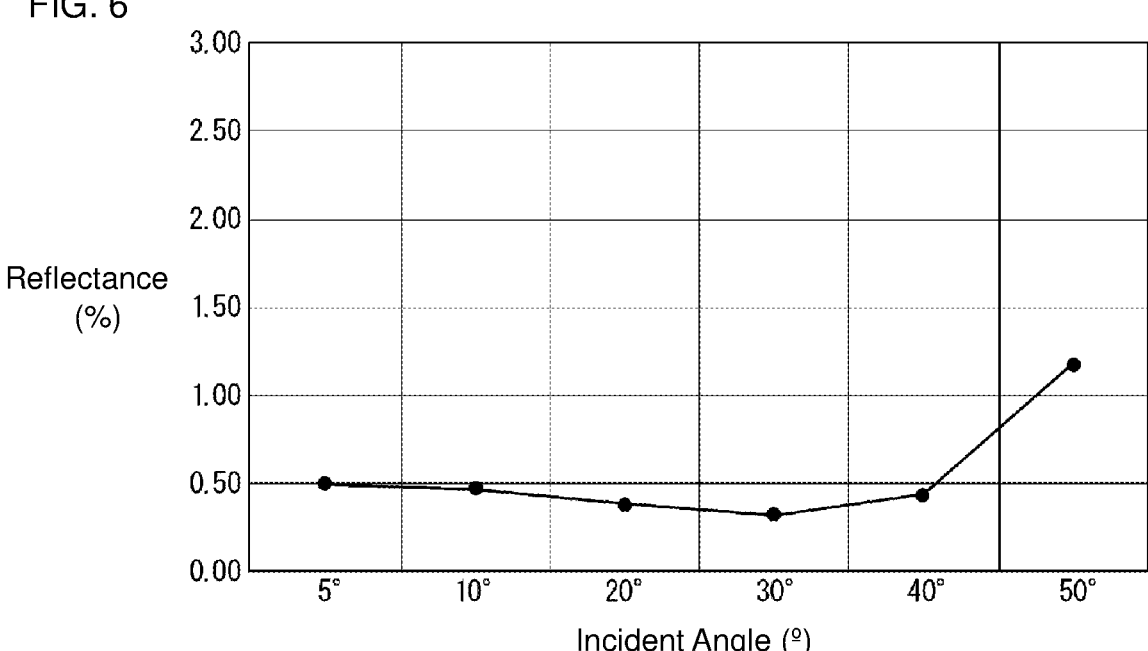
FIG. 6 is a graph illustrating the reflectance when light with a wavelength of 380 nm to 780 nm from a standard light source D65 is incident at incident angles of 5°, 10°, 30°, 40° and 50° relative to the surface of the optical laminate of Example 1.
Figures 7, 8:
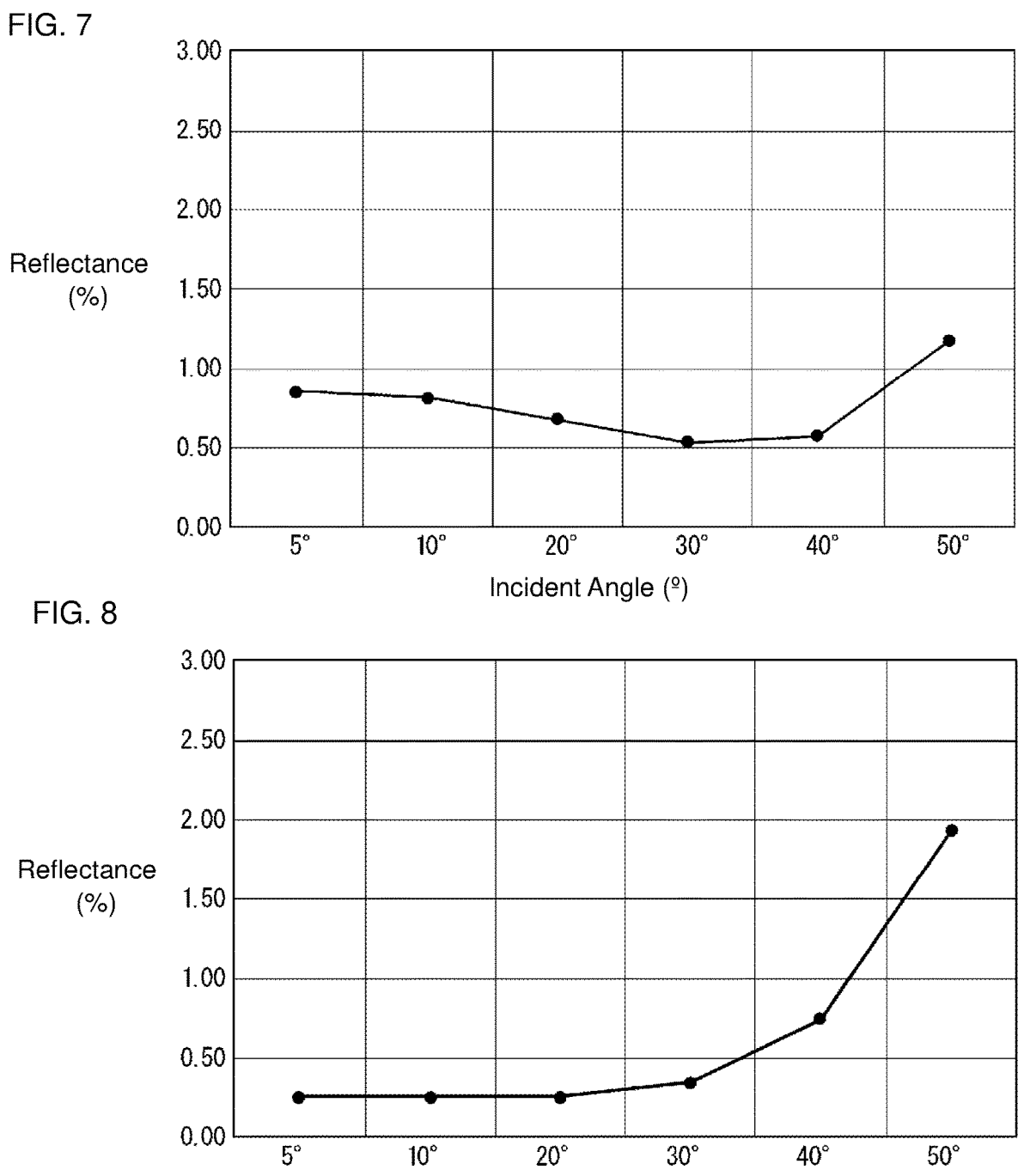
FIG. 7 is a graph illustrating the reflectance when light with a wavelength of 380 nm to 780 nm from a standard light source D65 is incident at incident angles of 5°, 10°, 30°, 40° and 50° relative to the surface of the optical laminate of Example 2.
FIG. 8 is a graph illustrating the reflectance when light with a wavelength of 380 nm to 780 nm from a standard light source D65 is incident at incident angles of 5°, 10°, 20°, 30°, 40° and 50° relative to the surface of the optical laminate of Comparative Example 1.
Figure 9:
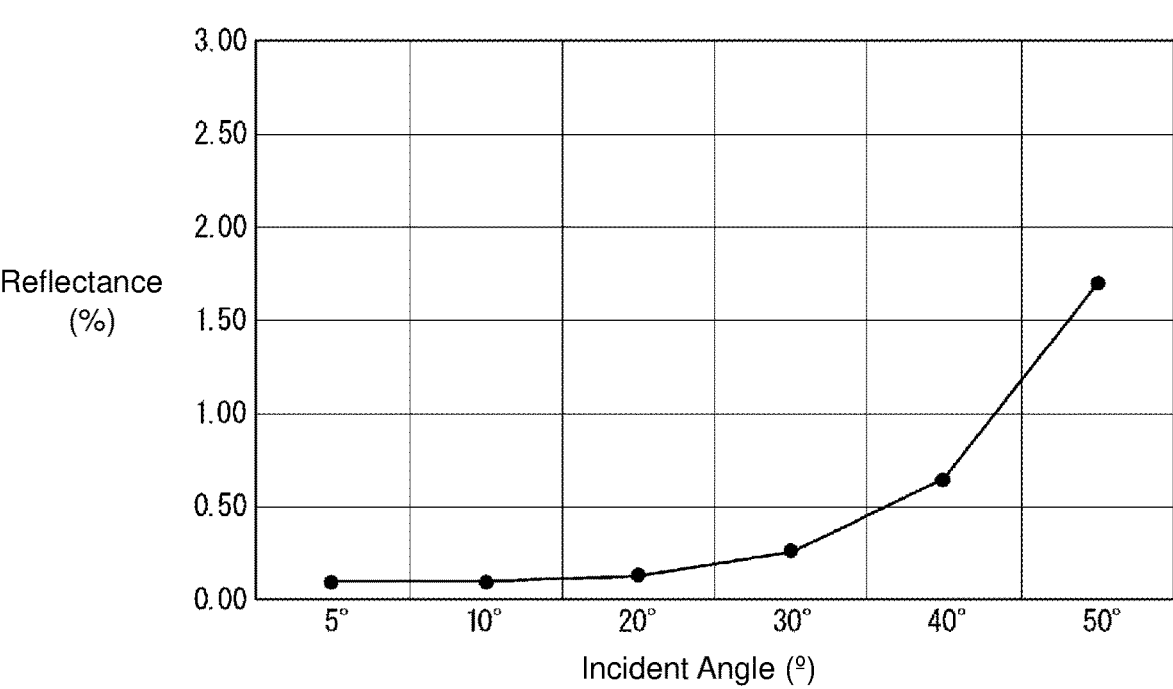
FIG. 9 is a graph illustrating the reflectance when light with a wavelength of 380 nm to 780 nm from a standard light source D65 is incident at incident angles of 5°, 10°, 30°, 40° and 50° relative to the surface of the optical laminate of Comparative Example 2.

FIG. 6 to FIG. 9 are graphs illustrating the reflectance when light with a wavelength of 380 nm to 780 nm from a standard light source D65 is incident at incident angles of 5°, 10°, 20°, 30°, 40° and 50° relative to the surface of the optical laminate. FIG. 6 is a graph illustrating the reflectance for Example 1, FIG. 7 is a graph illustrating the reflectance for Example 2, FIG. 8 is a graph illustrating the reflectance for Comparative Example 1, and FIG. 9 is a graph illustrating the reflectance for Comparative Example 2.

For each of the optical laminates of Examples 1 and 2 and Comparative Examples 1 and 2, the calculated L* values, a* values and b* values of the reflected light shown in Table 3 to Table 6 when the light was incident at incident angles of 5°, 10°, 20°, 30°, 40° and 50° relative to the surface of the optical laminate were used to calculate the value of ΔE*ab represented by formula (1) shown below. The results are shown in Table 3 to Table 6.

[Formula 3]

$$\Delta E^*ab = \sqrt{\Delta L^{*2} + \Delta a^{*2} + \Delta b^{*2}}$$ Formula (1)

(In formula (1), ΔE*ab represents the amount of change in the L* value, the a* value and the b* value in the CIE-Lab color system. ΔL* represents the maximum value of the difference between the L* values of the reflected light when light is incident at an incident angle of 10°, 20°, 30°, 40° and 50°, and the L* value of the reflected light when light is incident at an incident angle of 5°. Δa* represents the maximum value of the difference between the a* values of the reflected light when light is incident at an incident angle of 10°, 20°, 30°, 40° and 50°, and the a* value of the reflected light when light is incident at an incident angle of 5°. Δb* represents the maximum value of the difference between the b* values of the reflected light when light is incident at an incident angle of 10°, 20°, 30°, 40° and 50°, and the b* value of the reflected light when light is incident at an incident angle of 5°.)

Further, for each of the optical laminates of Examples 1 and 2 and Comparative Examples 1 and 2, the calculated values for the reflectance Y shown in Table 3 to Table 6 when the light was incident at incident angles of 5°, 10°, 20°, 30°, 40° and 50° relative to the surface of the optical laminate was used to calculate the value of ΔY represented by formula (3) shown below. The results are shown in Table 3 to Table 6.

ΔY=(reflectance when light is incident at an incident angle of 10°, 20°, 30°, 40° or 50°)−(reflectance when light is incident at an incident angle of 5°) Formula (3)

As illustrated in Table 3 and Table 4, and FIG. 1 and FIG. 2, the optical laminates of Example 1 and Example 2 exhibited a* values and b* values less than zero when light was incident at any incident angle from 5° to 50°, with the a* value and the b* value within the same quadrant of the a*b* plane. Further, as shown in Table 3 and Table 4, for the optical laminates of Example 1 and Example 2, the value of ΔE*ab was or less at incident angles of 10°, 20°, 30°, 40° and 50°.

Furthermore, as illustrated in Table 3 and Table 4, and FIG. 6 and FIG. 7, the optical laminates of Example 1 and Example 2 exhibited a difference ΔY between the reflectance at any of the incident angles of 10°, 20°, 30°, 40° and 50° and the reflectance at an incident angle of 5° that had an absolute value of 1% or less. Further, as illustrated in Table 3 and Table 4, and FIG. 6 and FIG. 7, for the optical laminates of Example 1 and Example 2, the reflectance at an incident angle of 30° was the lowest.

In contrast, as illustrated in Table 5 and FIG. 4, the optical laminate of Comparative Example 1 exhibited a* values and b* values of less than zero for the reflected light when light was incident at an incident angle of 5° to 30°. However, the b* value for the reflected light exceeded zero when light was incident at an incident angle of 40° or 50°. Accordingly, the a* values and the b* values when light was incident upon the optical laminate of Comparative Example 1 at incident angles within a range from 5 to 50° were not all within the same quadrant of the a*b* plane. Further, as shown in Table 5, for the optical laminate of Comparative Example 1, the values of ΔE*ab when the incident angle was 40° and 50° exceeded 10.

Further, as illustrated in Table 6 and FIG. 5, the optical laminate of Comparative Example 2 exhibited a* values and b* values of less than zero for the reflected light when light was incident at an incident angle of 5° to 20°. However, the b* value for the reflected light exceeded zero when light was incident at an incident angle of 30° to 50°. Accordingly, the a* values and the b* values when light was incident upon the optical laminate of Comparative Example 2 at incident angles within a range from 5 to 50° were not all within the same quadrant of the a*b* plane. Further, as shown in Table 6, for the optical laminate of Comparative Example 2, the value of ΔE*ab when the incident angle was 50° exceeded 10.

Furthermore, as illustrated in Table 5 and Table 6, and FIG. 8 and FIG. 9, the optical laminates of Comparative Example 1 and Comparative Example 2 exhibited a difference ΔY between the reflectance at an incident angle of 50° and the reflectance at an incident angle of 5° that had an absolute value exceeding 1%. Further, as illustrated in Table 5 and Table 6, and FIG. 8 and FIG. 9, for the optical laminates of Comparative Example 1 and Comparative Example 2, the reflectance at an incident angle of 5° was the lowest.

REFERENCE SIGNS LIST

1: Optical laminate
2: Transparent substrate
3: Hard coat layer
4: Optical functional layer
4*a*: Adhesive layer
41*b*: First high refractive index material layer
41*c*: First low refractive index material layer
42*b*: Second high refractive index material layer
42*c*: Second low refractive index material layer
5: Antifouling layer

The invention claimed is:

1. An optical laminate comprising:
a transparent substrate;
an optical functional layer; and
an antifouling layer, laminated in that order, wherein
when a light with a wavelength of 380 nm to 780 nm from a standard light source D65 is incident upon the optical laminate at an incident angle within a range from 5° to 50° relative to a surface of the optical laminate, an a* value and a b* value in a CIE-Lab color system of a reflected light are within a same quadrant of the a*b* plane, and
a maximum value of a difference between reflectance values when the light is incident at an incident angle of 10°, 20°, 30°, 40° and 50° relative to the surface, and a reflectance when the light is incident at an incident angle of 5°, expressed as an absolute value, is 1% or less.

2. The optical laminate according to claim 1, wherein the a* value and the b* value of the reflected light when the light is incident at an incident angle within a range from 5° to 50° relative to the surface are both less than zero.

3. The optical laminate according to claim 1, wherein the reflected light when the light is incident at an incident angle within a range from 5° to 50° relative to the surface has a ΔE*ab value represented by formula (1) of 10 or less:

$$\Delta E^*ab = \sqrt{\Delta L^{*2} + \Delta a^{*2} + \Delta b^{*2}} \qquad \text{Formula (1)}$$

wherein in formula (1), ΔE*ab represents an amount of change in an L* value and the a* value and b* value in the CIE-Lab color system, ΔL* represents a maximum value of a difference between the L* values of the reflected light when the light is incident at an incident angle of 10°, 20°, 30°, 40° and 50°, and the L* value of the reflected light when the light is incident at an incident angle of 5°, Δa* represents a maximum value of a difference between the a* values of the reflected light when the light is incident at an incident angle of 10°, 20°, 30°, 40° and 50°, and the a* value of the reflected light when the light is incident at an incident angle of 5°, and Ab* represents a maximum value of a difference between the b* values of the reflected light when the light is incident at an incident angle of 10°, 20°, 30°, 40° and 50°, and the b* value of the reflected light when the light is incident at an incident angle of 5°.

4. The optical laminate according to claim 1, wherein
the optical functional layer is composed of a laminate comprising a low refractive index material layer and a high refractive index material layer formed from a material with a higher refractive index than the low refractive index material layer laminated in an alternating arrangement,
a first high refractive index material layer formed from the high refractive index material layer and having a thickness of at least 7.5 nm is disposed on the transparent substrate side of the laminate,
a first low refractive index material layer formed from the low refractive index material layer and having a thickness of 27 nm to 37 nm is disposed in contact with the first high refractive index material layer, and
a second low refractive index material layer formed from the low refractive index material layer and having a thickness of 85 nm to 103 nm is disposed on the antifouling layer side of the laminate.

5. The optical laminate according to claim 4, wherein
a second high refractive index material layer formed from the high refractive index material layer and having a thickness of at least 105 nm to 120 nm is disposed between the first low refractive index material layer and the second low refractive index material layer, and
the optical functional layer is composed of four layers: the first high refractive index material layer, the first low refractive index material layer, the second high refractive index material layer, and the second low refractive index material layer.

6. The optical laminate according to claim 1, further comprising an adhesive layer between the transparent substrate and the optional functional layer, wherein
the adhesive layer comprises at least one metal compound selected from the group consisting of a metal, an alloy, a metal oxide, a metal fluoride, a metal sulfide, and a metal nitride.

7. The optical laminate according to claim 6, wherein the adhesive layer comprises a metal oxide in an oxygen-deficient state.

8. The optical laminate according to claim 6, further comprising a hard coat layer between the transparent substrate and the adhesive layer.

9. An article comprising the optical laminate according to claim 1.

10. The article according to claim 9, further comprising an image display device, wherein the optical laminate is provided on a surface of the image display device.

11. The optical laminate according to claim 1, wherein the absolute value of the a* value is not more than 10.0 and the absolute value of the b* value is not more than 10.0, when light is incident at an incident angle of 5° to 50°.

12. The optical laminate according to claim 1, wherein the absolute value of the a* value is not more than 5.0 and the absolute value of the b* value is not more than 6.0, when light is incident at an incident angle of 5° to 50°.

\* \* \* \* \*